(12) United States Patent
Furry

(10) Patent No.: US 7,503,650 B2
(45) Date of Patent: Mar. 17, 2009

(54) GLOW IN THE DARK, HEAT SENSITIVE COLOR CHANGING EAR PIECES OR NOSE REST

(76) Inventor: Brenda K. Furry, 319 Central Ave., Tiltonsville, OH (US) 43963

( * ) Notice: Subject to any disclaimer, the term of this patent is extended or adjusted under 35 U.S.C. 154(b) by 74 days.

(21) Appl. No.: 11/495,399

(22) Filed: Jul. 28, 2006

(65) Prior Publication Data

US 2007/0024807 A1    Feb. 1, 2007

Related U.S. Application Data

(60) Provisional application No. 60/595,719, filed on Jul. 29, 2005.

(51) Int. Cl.
*G02C 1/00* (2006.01)
(52) U.S. Cl. .............................. 351/158; 351/41; 351/51
(58) Field of Classification Search .................... 351/51, 351/52, 49, 41, 158, 111, 136, 124, 86, 103
See application file for complete search history.

(56) References Cited

U.S. PATENT DOCUMENTS

| 669,949 | A | 4/1901 | Underwod |
|---|---|---|---|
| 2,790,910 | A | 4/1957 | Cameron |
| 4,254,451 | A | 3/1981 | Cochran, Jr. |
| 5,013,145 | A | 5/1991 | Croll |
| 5,189,445 | A | 2/1993 | Stagner |
| 5,440,354 | A | 8/1995 | Just |
| 5,455,637 | A | 10/1995 | Kallman et al. |
| 5,946,071 | A | 8/1999 | Feldman |
| 5,949,516 | A | 9/1999 | Curdy |
| 5,992,996 | A | 11/1999 | Sawyer |
| 6,196,680 | B1 | 3/2001 | Novak |
| 6,281,165 | B1 | 8/2001 | Cranford |
| 6,857,739 | B1 | 2/2005 | Watson |
| 7,011,425 | B2 | 3/2006 | Morris et al. |

*Primary Examiner*—Hung X Dang
(74) *Attorney, Agent, or Firm*—John D. Pemberton; Law Office of J.D. Pemberton

(57) ABSTRACT

A set of eyeglasses wherein the nose rest and/or earpiece changes color when exposed to body heat. The nose rest and/or earpiece may contain a thermochromic material that is brightly colored and/or glow in the dark when not being worn and then when the eyeglasses are being worn, the material changes into a more desirable color for fashion purposes.

20 Claims, 1 Drawing Sheet

GLOW IN THE DARK, HEAT SENSITIVE COLOR CHANGING EAR PIECES OR NOSE REST

CLAIM OF PRIORITY

This application claims the benefit of U.S. Provisional Application No. 60/595,719 filed Jul. 29, 2005 which is incorporated herein by reference.

BACKGROUND OF THE INVENTION

1. Technical Field

This invention relates to eyeglasses, and more particularly, to earpieces and nose rests on eyeglasses.

2. Description of Related Art

It is believed that reading glasses first appeared in Italy in the 1260's and their popularity was instantaneous. However the initial design had a huge problem because it lacked an earpiece and there was not an easy way to keep the glasses from sliding down the nose. It wasn't until 1730, nearly 500 years after they were first introduced, that a London optician finally devised the rigid sidepieces that rest atop the ears. The basic design is still in use today.

Today's eyeglasses come in many different styles and varieties. However, often user's can get their eyeglasses confused with somebody else's. This is particularly true for those will very poor eyesight. In addition, when somebody needs their eyeglasses at night, often the glasses are hard to find in the dark. What is needed is a way to easily distinguish one set of eyeglasses from another. It would be beneficial if the eyeglasses could glow in the dark and it would be even more beneficial if the eyeglasses were fashionable and would not bring unwanted attention to a user wearing them.

SUMMARY OF INVENTION

The present invention solves the above-described problem by providing a set of eyeglasses wherein the nose rest and/or earpiece changes color or become clear when exposed to body heat. The nose rest and/or earpiece may contain a thermochromic material that is brightly colored and/or glows in the dark when not being worn and then when the eyeglasses are being worn, the material changes into a more desirable color for fashion purposes.

Thermochromic material is a temperature sensitive compound that temporarily change color with exposure to heat. Typically, the thermochromic material contains thermochromic inks or dyes that come in two forms, liquid crystals and leuco dyes.

Liquid crystals are used in precision applications because their responses can be engineered to accurate temperatures. However, the color range of liquid crystals is limited by their principle of operation. Leuco dyes are easier to work with and allow for a greater range of applications. However, the response of leuco dyes to specific temperature triggers is more difficult to set with accuracy. Use of liquid crystals, leuco dyes, or some other similar approach is dependant on the desired effects of the thermochromic material. If an accurate response to a specific temperature is desired, then liquid crystals may be used. If a wide choice of colors is the priority, then leuco dyes may be used.

Preferably, the thermochromic inks or dyes will be microencapsulated in the form of a suspension. For example, tiny chemical bubbles may be incorporated in a plastic material wherein inside each bubble are several chemicals, one of which melts at a temperature very near the temperature of the ear or nose. When that chemical melts, it begins to interfere with the other chemicals so that they lose their colors. That way, part of the nose rest's and/or earpiece's color disappears when it warms up. The nose rest and/or earpiece may contain other normal pigments so that it doesn't become colorless when warm, but becomes more lightly colored and compliments the aesthetics of the eyeglasses. Alternatively, the nose rest and/or earpiece may not contain any pigments so the nose rest and/or earpiece become colorless and clear or opaque when worn.

In another embodiment, the nose rest and/or earpiece may contain a photoluminescent material, preferably a phosphorescence material, that allows the nose rest and/or earpiece to glow in the dark. Phosphorescence is a specific type of photoluminescence, related to fluorescence, however unlike fluorescence, a phosphorescent material does not immediately discharge the radiation it absorbs. Instead, the radiation is released very slowly and continuously in the form of a glowing light that can last for hours. If the nose rest and/or earpiece contain a photoluminescent material, then in one embodiment, the illuminating effect of the material is canceled or masked when the eyeglasses are worn.

The nose rest and/or earpiece may be made in different textures such as soft, hard, rubber, plastic, ect. All different designs could be incorporated in or on the nose rest and/or earpiece and the design may even include numbers or letters. For example, when not being worn, the nose rest and/or earpiece may have bright green and yellow strips but when worn, the stripes become polka dots, a more neutral color, or even completely disappear. Also, the owner of the eyeglasses initials may be visible on the nose rest and/or eyepiece when the glasses are not worn, but then the initials disappear shortly after the glasses are put on and worn.

Other features and advantages of the present invention will become apparent upon reading the following detailed description of embodiments of the invention, when taken in conjunction with the appended claims.

DETAILED DESCRIPTION OF THE INVENTION

Figure 1:
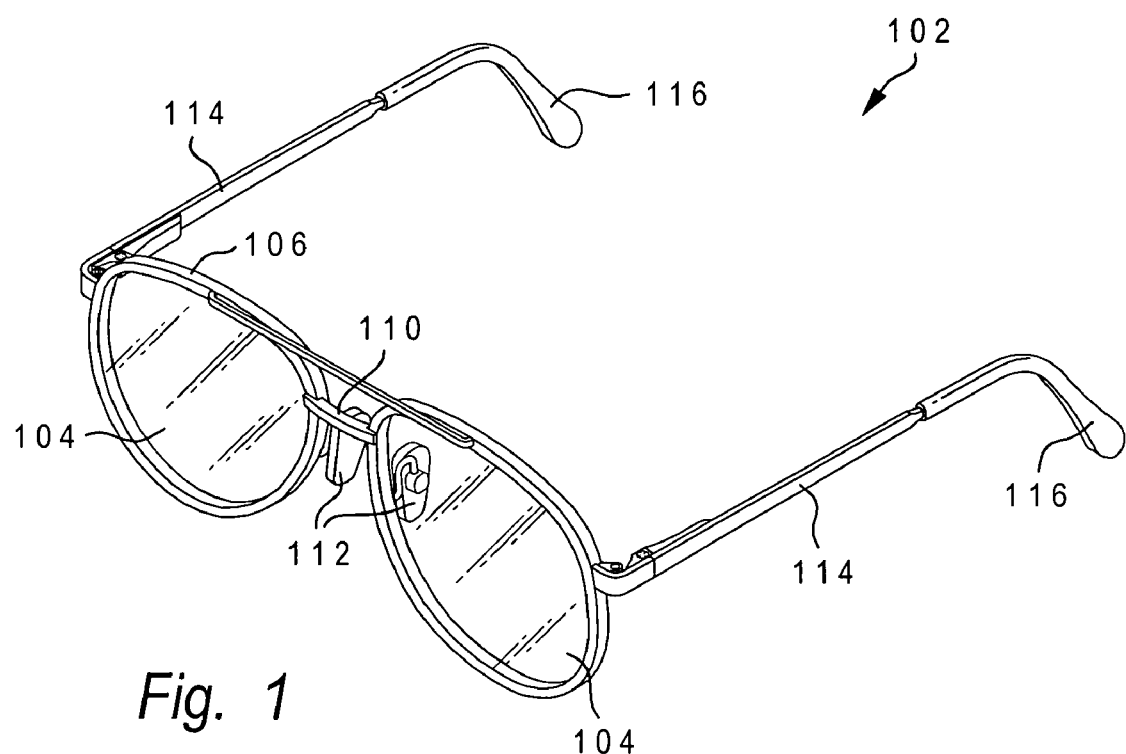
FIG. 1 is a plane view of eyeglasses in accordance with an embodiment of the present invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings are indicated with like reference numerals and similar features as shown in alternate embodiments in the drawings are indicated with similar reference numerals.

Figure 2:
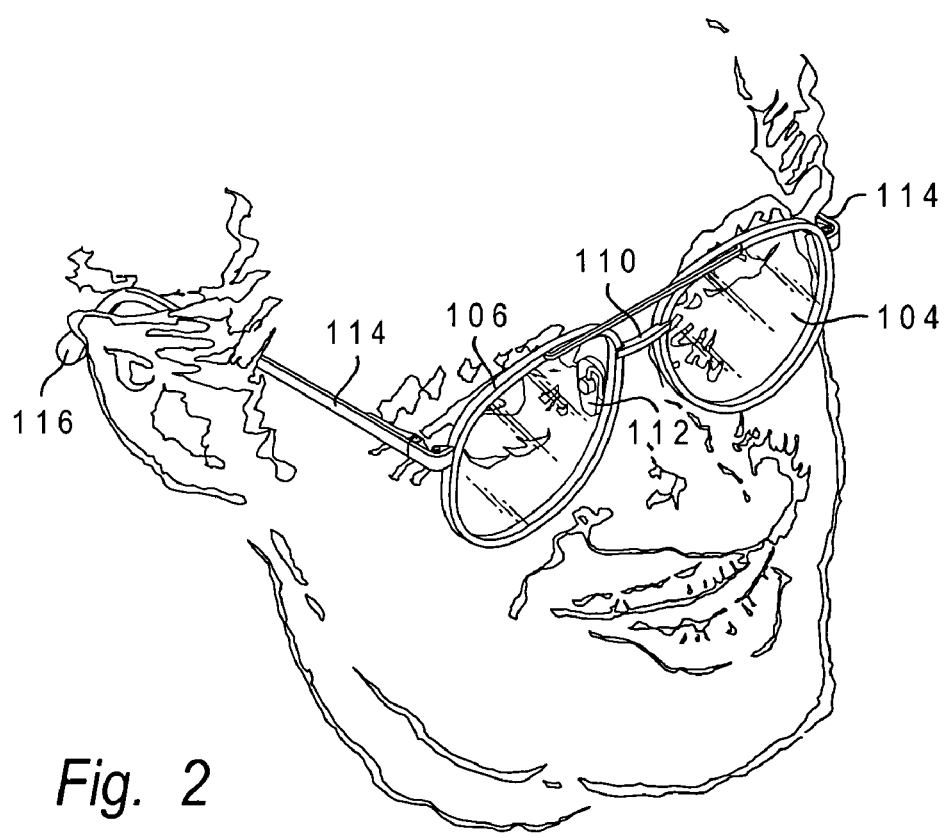
FIG. 2 is a plan view of the eyeglasses being worn by a user in accordance with an embodiment of the present invention.

Referring to FIG. 1, shown is a typical set of eyeglasses 102 as is know in the art. Eyeglasses 102 contain lenses 104, eye-wires or rims 106 which is the part of eyeglasses 102 that lenses 104 are inserted, bridge 110 which is the area between lenses 104 that goes over the nose of a wearer of eyeglasses 102, as shown in FIG. 2, and supports 90 percent of the weight of eyeglasses 102, nose rest 112 that helps keep eyeglasses 102 in place when being worn and helps distribute the weight of eyeglass 102 on the nose of the wearer, temples 114 which are the part of eyeglass 102 that extend over and/or behind the ears of the wearer to help hold the frame in place, and ear pieces 116 that cover the ends of temples 114 and make wearing eyeglasses 102 more comfortable and help keep eyeglasses 102 in place when being worn.

In the present invention, nose rest 112 and/or earpiece 116 are comprised of a thermochromatic material that has the ability to change color due to a change in temperature. The material may be based on liquid crystals, leuco dyes, or some other similar approach used to create thermochromatic material known in the art. Use of liquid crystals, leuco dyes, or some other similar approach is based on the desired application and the intended use of nose rest 112 and/or earpiece 116. Preferably, nose rest 112 and/or earpiece also have a white or reflective undercoat to enhance the color of the thermochromatic material.

For example, liquid crystals are used in relatively precise applications, as their responses can be engineered to accurate temperatures, but their color range is limited by their principle of operation. Some liquid crystals are capable of displaying different colors at different temperatures and the temperature change is dependent on selective reflection of certain wavelengths by the crystallic structure of the material as it changes between the low-temperature crystallic phase, through the anisotropic chiral or twisted nematic phase, to the high-temperature isotropic liquid phase. Only the nematic mesophase has thermochromic properties which restricts the effective temperature range of the material.

The reason the nematic mesophase has thermochromic properties is because the molecules orient in layers with regularly changing orientation and gives them periodic spacing. The light passing the crystal in the nematic mesophase undergoes Bragg diffraction on these layers and the wavelength with the greatest constructive interference is reflected back, which is perceived as a spectral color. As the crystal undergoes changes in temperature, thermal expansion occurs, resulting in a change of spacing between the layers, and therefore in the reflected wavelength. Consequently, the color of the thermochromic liquid crystal can continuously range from black, through the spectral colors, and then to black again. If a liquid crystal approach is used in nose rest 112 and/or earpiece 116, then preferably the dyes or inks will be microencapsulated in the form of a suspension.

Liquid crystals are used where the color change has to be accurately defined such as in children's glasses to monitor when the child has a high fever. In this example, the eyepiece could turn a warning color when the child has a high fever and requires attention. Another example of where liquid crystals may be used is in safety glasses to monitor the temperature of a worker. For example, if the worker were to become too hot or too cold, nose rest 112 and/or earpiece 116 would turn a warning color thereby altering others that the wearer is too hot or too cold. If a wider range of colors is desired, then leuco dyes may be used.

Leuco dyes allow wider range of colors to be used, but the temperature response is less accurate than liquid crystals and specific temperature triggers are more difficult to set with accuracy. A leuco dye is a dye whose molecules can acquire two forms, one of which is colorless. If a leuco dye approach is used in nose rest 112 and/or earpiece 116 then mixtures of leuco dyes and suitable other chemicals will be microencapsulated with the mixture sealed inside. Microencapsulation is desirable because it allows use in wide range of materials and products as the size of the microcapsules typically ranges between 3-5 μm.

In one embodiment, nose rest 112 and/or earpiece 116 may contain a photoluminescent material, preferably a phosphorescence material, that allows the nose rest 112 and/or earpiece 116 to glow in the dark. Phosphorescence is a specific type of photoluminescence, related to fluorescence, and is preferable because unlike fluorescence, a phosphorescent material does not immediately discharge the radiation it absorbs and the radiation is released very slowly and continuously in the form of a glowing light that can last for hours.

If nose rest 112 and/or earpiece 116 contain a photoluminescent material, then in one embodiment, the illuminating effect of the material is canceled or masked when the eyeglasses are worn. For example, the photoluminescent material may be only on the inside of nose rest 112 and/or earpiece 116 so the material can be seen when the glasses are not being worn but when worn, the phosphorescent material cannot be seen or is relatively hidden. In another example, when not being worn, nose rest 112 and/or earpiece 116 may contain a photoluminescent material and a thermochromic material. When worn, the thermochromatic material produces a color that cancels, masks, or hides the illuminating effect of the photoluminescent material.

In another embodiment, the thermochromatic material is paint and nose rest 112 and/or earpiece 116 is painted with color changing pigments. Use of thermochromic paint is known in the art and involves liquid crystal or leuco dye technology. In use, after absorbing a certain amount of light or heat, the crystallic or molecular structure of the pigment reversibly changes in such a way that it absorbs and emits light at a different wavelength than at lower temperatures and becomes colored or transparent depending on 0.4 the desired effect.

In another embodiment, the color change of nose rest 112 and/or earpiece 116 may be linked to electronic properties of nose rest 112 and/or earpiece 116. For example, nose rest 112 and/or earpiece 116 may use the conductivity of the body of the user to activate or deactivate a color, pattern, or illuminating effect.

It should be understood that the foregoing relates to exemplary embodiments of the invention and that modifications may be made without departing from the spirit and scope of the invention as set forth in the following claims.

What is claimed is:

1. A set of eyeglasses comprising:
   a rim;
   at least two lenses secured to the rim;
   a bridge connecting the at least two lenses;
   at least one nose rest attached to the bridge wherein the at least one nose rest is comprised of thermochromatic material; and
   at least two temples attached to the frame.

2. The eyeglasses of claim 1 wherein the thermochromatic material in the at least one nose rest is produced using at least one liquid crystal.

3. The eyeglasses of claim 1 wherein the thermochromatic material in the at least one nose rest is produced using at least one leuco dye.

4. The eyeglasses of claim 1 wherein the at least one nose rest contains a photoluminescent material.

5. The eyeglasses of claim 1 further comprising at least two earpieces connected to the at least two temples wherein the two earpieces are comprised of thermochromatic material.

6. The eyeglasses of claim 5 wherein the thermochromatic material in the at least two earpieces is produced using at least one liquid crystal.

7. The eyeglasses of claim 5 wherein the thermochromatic material in the at least two earpieces is produced using at least one leuco dye.

8. A set of eyeglasses comprising:
a rim;
at least two lenses secured to the rim;
a bridge connecting the at least two lenses;
at least two temples attached to the frame; and
at least two earpieces connected to the at least two temples wherein the two earpieces are comprised of thermochromatic material.

9. The eyeglasses of claim 8 wherein the thermochromatic material in the at least two earpieces is produced using at least one liquid crystal.

10. The eyeglasses of claim 8 wherein the thermochromatic material in the at least two earpieces is produced using at least one leuco dye.

11. The eyeglasses of claim 8 wherein the at least two earpieces contains a photoluminescent material.

12. The eyeglasses of claim 8 further comprising at least one nose rest connected to the bridge wherein at least one nose rest is comprised of thermochromatic material.

13. The eyeglasses of claim 12 wherein the thermochromatic material in the at least one nose rest is produced using at least one liquid crystal.

14. The eyeglasses of claim 12 wherein the thermochromatic material in the at least one nose rest is produced using at least one liquid crystal.

15. A set of eyeglasses comprising:
a rim;
at least two lenses secured to the rim;
a bridge connecting the at least two lenses;
at least one nose rest attached to the bridge wherein the at least one nose rest is comprised of thermochromatic material;
at least two temples attached to the frame; and
at least two earpieces connected to the at least two temples wherein the two earpieces are comprised of thermochromatic material.

16. The eyeglasses of claim 15 wherein the thermochromatic material in the at least one nose rest and the at least two earpieces is produced using at least one liquid crystal.

17. The eyeglasses of claim 15 wherein the thermochromatic material in the at least one nose rest and at least two earpieces is produced using at least one leuco dye.

18. The eyeglasses of claim 15 wherein the nose rest and earpiece contain a photoluminescent material.

19. The eyeglasses of claim 18 wherein the photoluminescent material is visible when the glasses are not being worn but is not visible when the glasses are being worn.

20. The eyeglasses of claim 18 wherein the photoluminescent material masks the illuminating effects of the photoluminescent material.

* * * * *